(12) United States Patent
Wu et al.

(10) Patent No.: US 9,928,313 B2
(45) Date of Patent: Mar. 27, 2018

(54) SEASONAL QUERY SUGGESTION SYSTEM AND METHOD

(71) Applicant: YAHOO HOLDINGS, INC., Sunnyvale, CA (US)

(72) Inventors: Huming Wu, San Jose, CA (US); Shenhong Zhu, Santa Clara, CA (US)

(73) Assignee: OATH INC., New York, NY (US)

( * ) Notice: Subject to any disclaimer, the term of this patent is extended or adjusted under 35 U.S.C. 154(b) by 289 days.

(21) Appl. No.: 14/739,487

(22) Filed: Jun. 15, 2015

(65) Prior Publication Data
US 2016/0364502 A1 Dec. 15, 2016

(51) Int. Cl.
G06F 17/30 (2006.01)

(52) U.S. Cl.
CPC .... G06F 17/30973 (2013.01); G06F 17/3053 (2013.01); G06F 17/30598 (2013.01); G06F 17/30867 (2013.01)

(58) Field of Classification Search
None
See application file for complete search history.

(56) References Cited

U.S. PATENT DOCUMENTS

| | | | | |
|---|---|---|---|---|
| 8,521,739 B1* | 8/2013 | Pasca | | G06F 17/30864 707/736 |
| 8,924,379 B1* | 12/2014 | Kim | | G06F 17/30657 707/725 |
| 2010/0058196 A1* | 3/2010 | Krishnan | | G06Q 10/10 715/747 |
| 2011/0055189 A1* | 3/2011 | Effrat | | G06F 17/3064 707/706 |
| 2011/0179017 A1* | 7/2011 | Meyers | | G06Q 30/0254 707/722 |
| 2012/0310922 A1* | 12/2012 | Johnson | | G06F 17/30867 707/722 |
| 2013/0191458 A1* | 7/2013 | Krishnan | | H04L 67/22 709/204 |
| 2014/0040245 A1* | 2/2014 | Rubinstein | | G06F 17/30528 707/722 |
| 2014/0310255 A1* | 10/2014 | Cardell | | G06F 17/30864 707/706 |

(Continued)

*Primary Examiner* — Hung Le
(74) *Attorney, Agent, or Firm* — James J. DeCarlo; Greenberg Traurig, LLP

(57) ABSTRACT

A seasonality-aware search assist identifies seasonal search query suggestions using seasonal information associated with the seasonal search query suggestions. A user's search query input, temporal information associated with the user's search query input and a seasonal information associated with each seasonal-aware search query suggestion candidates may be used to identify a number of seasonal search query suggestions for presentation to the user. Seasonal search query suggestion candidates may be promoted in a list of search query suggestions presented to the user, and any non-seasonal search query suggestions included in the list may be positioned below the seasonal search query suggestions in the list. A popularity score associated with each of the listed seasonal search query suggestions may be used to order the seasonal search query candidates, and a popularity score associated with each of the listed non-seasonal search query suggestions may be used to order the non-seasonal search query suggestions.

21 Claims, 11 Drawing Sheets

(56) References Cited

U.S. PATENT DOCUMENTS

| | | | |
|---|---|---|---|
| 2015/0169606 A1* | 6/2015 | Zhu | G06F 17/30867 707/706 |
| 2015/0178302 A1* | 6/2015 | Plakhov | G06F 17/30864 707/706 |
| 2015/0278355 A1* | 10/2015 | Hassanpour | G06F 17/30864 707/706 |
| 2015/0310105 A1* | 10/2015 | Brew | G06F 17/30528 707/706 |
| 2015/0317316 A1* | 11/2015 | Ghanekar | G06F 17/30864 707/706 |
| 2016/0012104 A1* | 1/2016 | Petrov | G06F 17/30395 707/706 |
| 2016/0041991 A1* | 2/2016 | Sahuguet | G06F 17/3064 707/706 |
| 2016/0078101 A1* | 3/2016 | Somaiya | G06F 17/3064 707/706 |
| 2016/0092598 A1* | 3/2016 | Mishra | G06F 17/30867 707/740 |

* cited by examiner

SEASONAL QUERY SUGGESTION SYSTEM AND METHOD

FIELD OF THE DISCLOSURE

The present disclosure relates to information searching, and more particularly, to a search assistant, which uses seasonal information, e.g., seasonal patterns found in past query activities, to recommend one or more alternatives to complete the user's query

BACKGROUND

There is a vast amount of digital information available to computer users. Computer users typically use a search tool that allows them to input a query, which can include words, phrases, etc. The search tool, e.g., a search engine, uses the query to search for and locate a set of search results relevant to the user's query.

SUMMARY

It would be beneficial to assist the user in the user's search. Embodiments of the present disclosure assist a user's search and provide the user with one or more search query recommendations in response to receiving query input, e.g., at least a portion of the user's query input, from the user. In accordance with one or more embodiments, the user's search query input is received prior to receiving input from the user indicating the user's desire to submit the query, e.g., prior to receiving input submitting the query and requesting a search be conducted using the query input.

In accordance with one or more embodiments, one or more search query suggestions, or recommendations, can be presented to the user, each search query suggestion is selectable by the user to complete or replace the user's search query. A user's search query suggestion selection can be input with the user's request for a search to be performed using the search query suggestion selection as at least a part of the search criteria.

In accordance with one or more embodiments, search query suggestions are selected for presentation to the user using seasonal information of at least some of the search query suggestions and temporal information associated with search query input received from the user. In accordance with one or more embodiments, a search query suggestion may have a determined seasonality that is used to determine whether or not to select the search query suggestion for presentation to the user given the user's search query input and temporal information obtained for the search query input.

In accordance with at least one such embodiment, the user's search query input, temporal information determined for the user's search query input, such as a time of the day, day of the week, week of the month, month, year, etc. and determined seasonality of search query suggestions are used to identify one or more seasonal search query suggestions for presentation to the user in response to receive the user's search query input.

In accordance with one or more such embodiments, seasonal search query suggestions may be presented together with other, non-seasonal search query suggestions. Search query suggestion candidates, which may include seasonal search query suggestions as well as non-seasonal search query suggestions, that match the user's search query input may be ranked in accordance with a score, such as a popularity score that is based on a frequency of occurrence of the search query in query logs, associated with each matching search query suggestion candidate. A number, N, of the highest-ranking matching search query suggestion candidates may be selected and made available for presentation to the user at the user's computing device. By way of some non-limiting examples, a seasonal search query suggestion selected for presentation to the user may be promoted in a listing of the matching search query suggestions to be presented to the user, and a non-seasonal search query suggestion selected for presentation to the user may be positioned below the seasonal search query in the listing. A matching search query suggestion may be identified as a seasonal search query suggestion using seasonal information associated with the search query suggestion and temporal information identifying a timing for the user's search query input.

In accordance with one or more embodiments, a method is provided, the method comprising generating, by a computing device, a database comprising a plurality of candidate search query suggestions, a number of the candidate search query suggestions of the plurality having associated seasonal information; receiving, over a network by the computing device, search query user input from a user computing device; obtaining, over the network by the computing device, temporal information representing the time the search query is input by the user; selecting, by the computing device, one or more search query suggestions from the database using the search query user input, the obtained temporal information and the associated seasonal information for the number of candidate search query suggestions, at least a portion of the seasonal information associated with each of the one or more selected search query suggestions matching the obtained temporal information; and making, by the computing device, a number of the one or more selected search query suggestions available for display at the user computing device.

In accordance with one or more embodiments a system is provided, the system comprising a computing device comprising a processor and a storage medium for tangibly storing thereon program logic for execution by the processor, the stored program logic comprising generating logic executed by the processor for generating a database comprising a plurality of candidate search query suggestions, a number of the candidate search query suggestions of the plurality having associated seasonal information; receiving logic executed by the processor for receiving, over a network, search query user input from a user computing device; obtaining logic executed by the processor for obtaining, over the network, temporal information representing the time the search query is input by the user; selecting logic executed by the processor for selecting one or more search query suggestions from the database using the search query user input, the obtained temporal information and the associated seasonal information for the number of candidate search query suggestions, at least a portion of the seasonal information associated with each of the one or more selected search query suggestions matching the obtained temporal information; and making logic executed by the processor for making a number of the one or more selected search query suggestions available for display at the user computing device.

In accordance with yet another aspect of the disclosure, a computer readable non-transitory storage medium is provided, the medium for tangibly storing thereon computer readable instructions that when executed cause at least one processor to generate a database comprising a plurality of candidate search query suggestions, a number of the candidate search query suggestions of the plurality having associated seasonal information; receive, over a network, search query user input from a user computing device; obtain, over the network, temporal information representing the time the search query is input by the user; select one or more search query suggestions from the database using the search query user input, the obtained temporal information and the associated seasonal information for the number of candidate search query suggestions, at least a portion of the seasonal information associated with each of the one or more selected search query suggestions matching the obtained temporal information; and make a number of the one or more selected search query suggestions available for display at the user computing device.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a time series including peaks in a query's frequency of occurrence determined for use in accordance with one or more embodiments of the present disclosure.

FIG. 2 provides another example of a query's peaks determined for use in accordance with one or more embodiments of the present disclosure.

FIG. 3 provides a user interface example in accordance with one or more embodiments of the present application.

FIG. 4 illustrates components of a system providing seasonal-aware search query suggestions in accordance with one or embodiments of the present disclosure.

FIG. 5 provides an example process flow used in classifying a query as seasonal or non-seasonal in accordance with one or more embodiments of the present disclosure.

FIG. 6 provides an example process flow used in peak detection in accordance with one or more embodiments of the present disclosure.

FIG. 7 is a process flow example in accordance with one or more embodiments of the present disclosure.

FIGS. 8 and 9 provide examples of seasonal component time series for use in accordance with one or more embodiments of the present disclosure.

DETAILED DESCRIPTION

Figure 1:
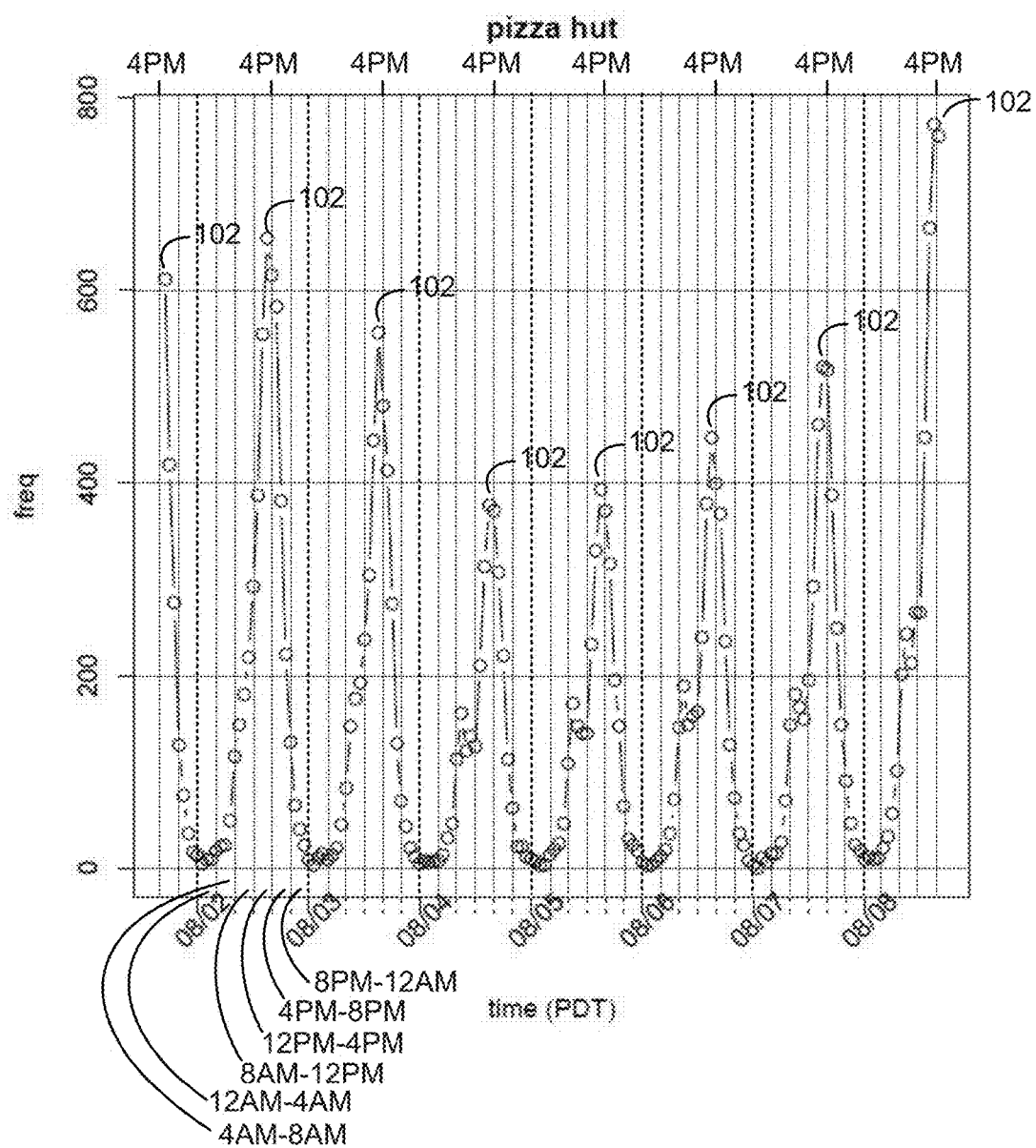

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a." "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for assisting a user with a search using seasonal information, such as and without limitation seasonal patterns and peaks detected using past query activities. Embodiments of the present disclosure assist a user's search and provide the user with one or more search query suggestions, or recommendations, in response to receiving query input, e.g., at least a portion of the user's query input, from the user. In accordance with one or more embodiments, the user's query input may be received prior to receiving input from the user indicating the user's desire to submit the query, e.g., prior to receiving the user's submission of a query requesting a search be conducted using the query input.

In accordance with one or more embodiments, prior to receiving a "submit" and in response to the user inputting at least a portion of the user's search query, embodiments of the present disclosure identify a set of search query suggestions comprising one or more seasonal search query suggestions. The set of search query suggestions, which may include seasonal search query suggestions as well as other search query suggestions, such as non-seasonal search query suggestions, can be made available for presentation at the user's computing device. Each search query suggestion is selectable by the user. A user's search query suggestion selection can augment or replace the user's search query input and may become at least a part of the user's request for a search.

In accordance with one or more embodiments, one or more search query suggestions have a seasonality aspect with associated seasonality information. In accordance with at least one such embodiment, the user's search query input, temporal information obtained from the user's computing device, or otherwise determined, for the user's search query input as well as a seasonality information associated with seasonal search query suggestion candidates may be used to identify a set of search query suggestions for the user. The set of search query suggestions may comprise a number of seasonal search query suggestions and a number of non-seasonal search query suggestions.

In accordance with one or more embodiments, popularity of each search query suggestion candidate may also be used in selecting the set of search query suggestions for the user. In accordance with the one or more embodiments, search query suggestion candidates may be ranked according to each candidate's popularity score, which score may be determined based on a frequency of occurrence of the candidate in one or more query logs. In accordance with one or more such embodiments, a number, N, of the top ranked search query suggestions may be selected for presentation to the user. In accordance with such embodiment(s), the N top ranked search query suggestions may be presented as a list, with the seasonal search query suggestions included in the N top-ranked suggestions being promoted to the top of the list above or before any non-seasonal search query suggestions included in the list. The seasonal search query suggestions in the list may be ordered based on their respective popularity scores, and the non-seasonal search query suggestions may be ordered based on their respective popularity scores.

A number, N, search query suggestions may be selected, e.g., from a database of search query suggestion candidates, to be presented to the user. The selected search query suggestions comprise some number of seasonal search query suggestion candidates and may optionally comprise non-seasonal search query suggestion candidates. By way of a non-limiting example, any search query suggestion candidate with a seasonal peak that matches or coincides with temporal information associated with the user's search query input can be identified as seasonal search query suggestions.

While search query suggestion candidates could be selected based on popularity alone, such a selection does not take into account variations in user information interests over time. If such variations are ignored, the same search query input received at different times, e.g., search query input received in the morning versus the same search query input received in the evening, results in the same set of search query suggestions being provided regardless of the timing of the search query input. By way of a non-limiting example, a user's information interests may vary depending on the time of day. For example, in the morning, a user may be interested in financial information, such as bank account information or stock market information, while in the evening the user may be interested in entertainment options, such as restaurants and/or movies. As yet another non-limiting example, holidays of the year, such as Thanksgiving and Christmas, may cause users to be interested in finding information relating to the holidays, such as gifting ideas. Embodiments of the present disclosure account for such variations in selecting search query suggestions for presentation to the user.

Variations in user information interests due to timing can be seen in a time series. FIG. 1 provides an example of a time series including peaks in a query's frequency of occurrence determined for use in accordance with one or more embodiments of the present disclosure. In the example shown in FIG. 1, an original time series generated using historical query information plots a query's frequency of occurrence at any given time during a given time span, or period. The horizontal axis represents time and the vertical axis represents frequency of occurrence of the query "pizza hut." The graph provided in the example is based on data collected, e.g., in query logs, over a period of a week. Each day is divided into four hour periods, 12 AM-4 AM, 4 AM-12 PM, 12 PM-4 PM, 4 PM-8 PM and 8 PM-12 AM. The graph illustrates, using points 102, that the query's frequency of occurrence peaks in the late afternoon at approximately 4 PM-5 PM each day. The graph further illustrates non-peak times of the day for the query.

Embodiments of the present disclosure identify seasonal peaks, such as those represented by points 102 on the graph with respect to a query. The seasonal peaks determined for the query may be used to identify the query's seasonality. Determined seasonality may be used to make search query suggestions in view of temporal information determined for a user's search query input and the user's search query input. For example and assuming that the "pizza hut" query has an associated daily seasonality with a determined 4 PM peak, that "pi" search query input is received from a user and the time of day of the user's input is determined to be 3:45 PM, such information may be used to select the "pizza hut" query as a search query suggestion to be presented to the user in response to the user's search query input, identify the search query suggestion as a seasonal search query suggestion for the user's search query input and to promote the seasonal search query suggestion when presenting a set of selected search query suggestions to the user. Alternatively and assuming that the user's search query input is received at 3:45 AM, the timing of the user's search query input along with the seasonality information associated with the "pizza hut" query may be used to select another search query suggestion, such as "pier one," for example; and/or to select the "pizza hut" query as a non-seasonal search query selection, which is demoted in the set of selected search query suggestions to be presented to the user.

Figure 2:
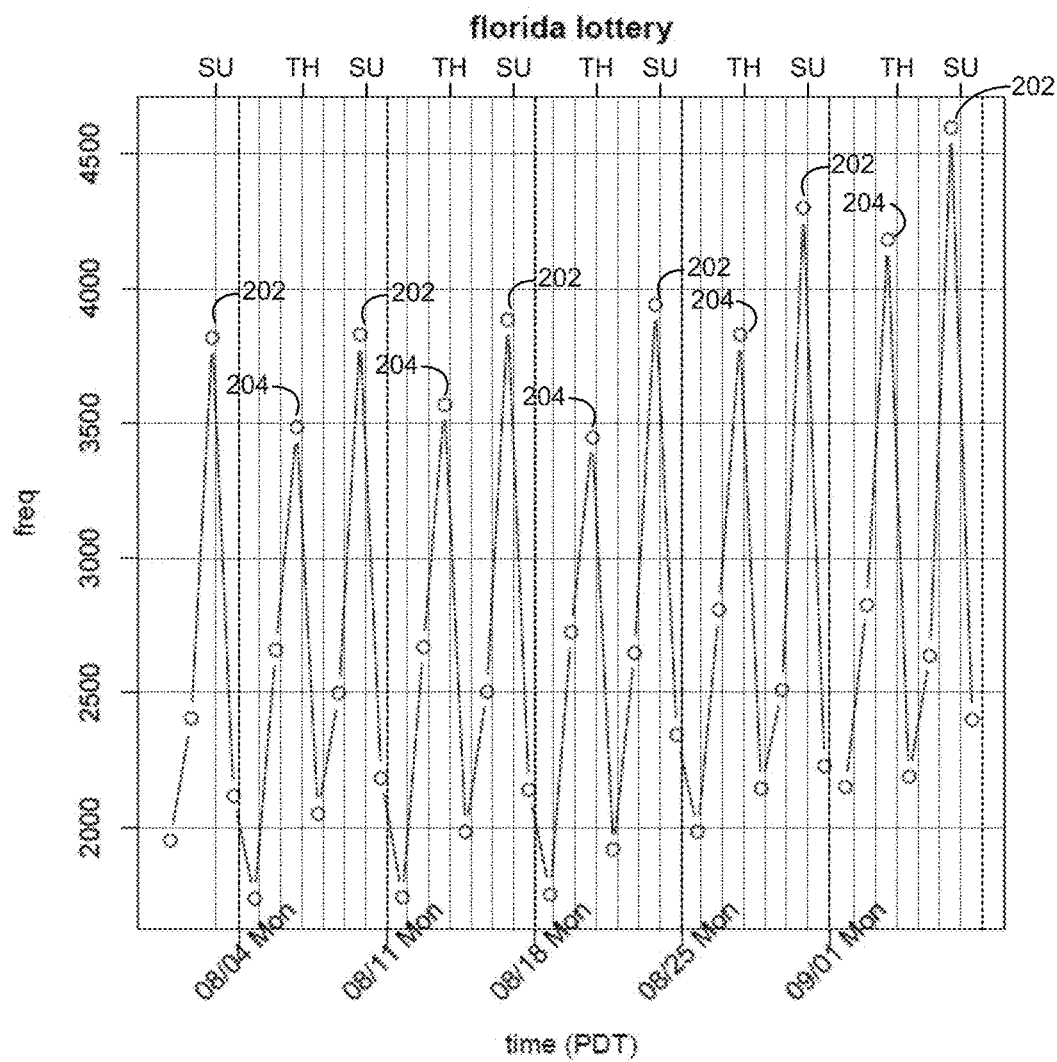

FIG. 2 provides another example of a time series for use in accordance with one or more embodiments of the present disclosure. In the example shown in FIG. 2, an original time series generated from historical query information is used to plot points for the "florida lottery" query, where each point has a frequency of occurrence component and a temporal component. In the example shown in FIG. 2, the horizontal axis represents time and the vertical axis represents frequency of occurrence for the query. The graph provided in the example is based on data collected, e.g., in query logs, over a two week period. Each week is divided into seven periods, each representing a day of the week. Points 202 and 204 shown on the graph illustrate that the query has seasonal peaks on Thursday and Sunday during the week. The graph further illustrates non-peak days of the week for the query.

In accordance with one or more embodiments, peaks in the "florida lottery" query's frequency of occurrence, such as those represented by points 202 and 204 on the time series shown in FIG. 2 may be identified to determine the query's seasonality, and such information may be used to determine seasonal aspects for the query. The query's seasonality may then be used to determine whether or not to include the query in a set of search query suggestions in view of temporal information determined for a user's search query input and the user's search query input and/or to determine whether to promote or demote the query in the set of search query suggestions. For example and assuming that the "florida lottery" query has an associated weekly seasonality of "Sunday" and "Thursday," that "florida" search query input is received from a user and the day of the week of the user's input is determined to be "Sunday," such information may be used to select the "florida lottery" query as a seasonal search query suggestion that is promoted in the set of search query suggestions to be presented to the user in response to the user's search query input. Alternatively and assuming that the user's search query input is received on "Wednesday," the timing of the user's search query input along with the seasonality information associated with the "florida lottery" query may be used to select another search query suggestion, such as "florida keys," for example, for presentation to the user; and/or to identify "florida lottery" as a non-seasonal search query suggestion that might be presented below seasonal search query suggestions selected for presentation to the user.

Figure 3:
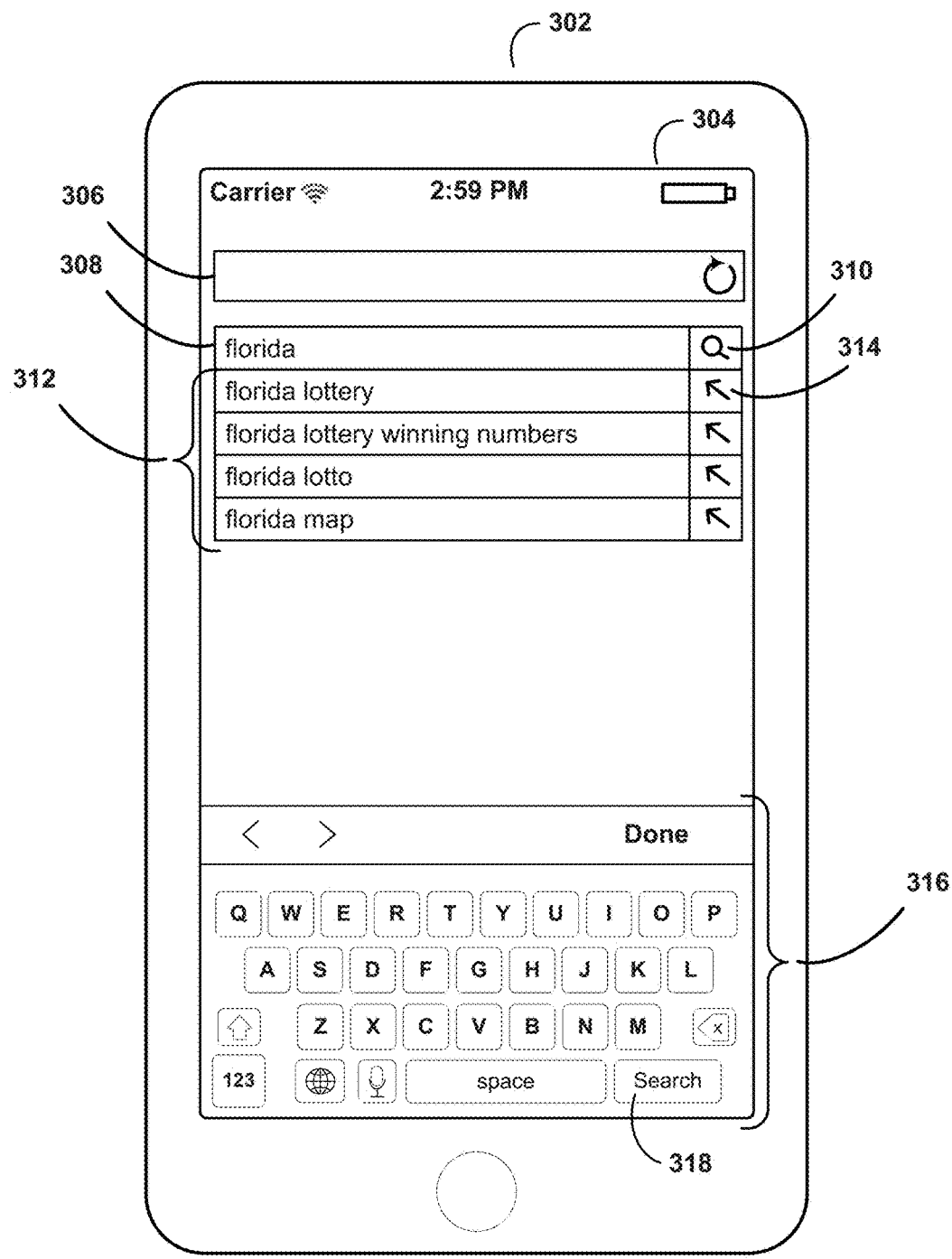

FIG. 3 provides a user interface example in accordance with one or more embodiments of the present application. In accordance with one or more such embodiments, some or all of the user interface may be transmitted to a user computing device, such as user computing device 302 shown in FIG. 3. In the example, user computing device 302 is a smartphone; however, it should be apparent that any computing device may be used with embodiments of the present application.

User computing device 302 comprises a displayed user interface 304, which comprises a URL input field 306, a search query input field 308, a search query submission control 310 represented as a magnifying glass icon in the example, and a portion 312 displaying a set of search query suggestions. User interface portion 312 comprises a control 314 represented as an arrow icon in the example, which may be used to receive input from the user indicating the user's desire to have a corresponding suggestion supplement or replace the user's query input.

In accordance with one or more embodiments, keyboard 316 may be used by the user to input a search query in field 308. As the search query input in field 308 is received from the user, embodiments of the present disclosure can process the user's search query input, prior to receiving input from the user via control 310 or search button 318, and generate the set of search query suggestions, which comprises one or more search query suggestions, displayed in portion 312 of the user interface 304. The set of search query suggestions comprising one or more search query suggestions can be based on the search query input, such as "florida" in the example of FIG. 3, temporal information associated with the user's search query input and seasonality information associated with seasonal search query candidates.

In accordance with one or more embodiments, the set of search query suggestions selected from the search query suggestion candidates may be a number, N, of search query suggestion candidates that each have a popularity score that exceeds a popularity threshold, and the selected search query suggestions having seasonality information corresponding to the temporal information identified for the user's search query input may be identified as seasonal search query suggestions. Using the above example, the "florida" search query user input, temporal information identifying the day of the week of the user's input, i.e., "Sunday," and the seasonality information identified for the "florida lottery" search query suggestion may be used to identify "florida lottery" as a seasonal search query suggestion, which may be promoted for presentation above any non-seasonal search query suggestions in portion 312 of user interface 304.

By way of a non-limiting example, search query suggestions to be presented to the user may comprise N of the top ranked, e.g., according to popularity scores, search query suggestion candidates that match the user's search query input. In accordance with one or more embodiments, a popularity of a search query suggestion may be determined based on a number of occurrences of the search query in a log of queries.

As input is received via search query input field 308, search query suggestions may be identified in response to the received input and displayed in portion 312 of user interface 304. The user may select one of the search query suggestions, such as and without limitation by selecting a search query suggestion's text or by selecting the icon 314 corresponding to the desired search query suggestion. In response to receiving input indicative of a user's selection of a search query suggestion, search query input field 308 can be updated to display the selected search query suggestion. Additionally, a new set of search query suggestions may be provided in portion 312 in response to the selected search query suggestion. The user may request that a search be conducted using the search query displayed in field 308 as criteria for a search by selecting icon 310 or button 318.

Figure 4:
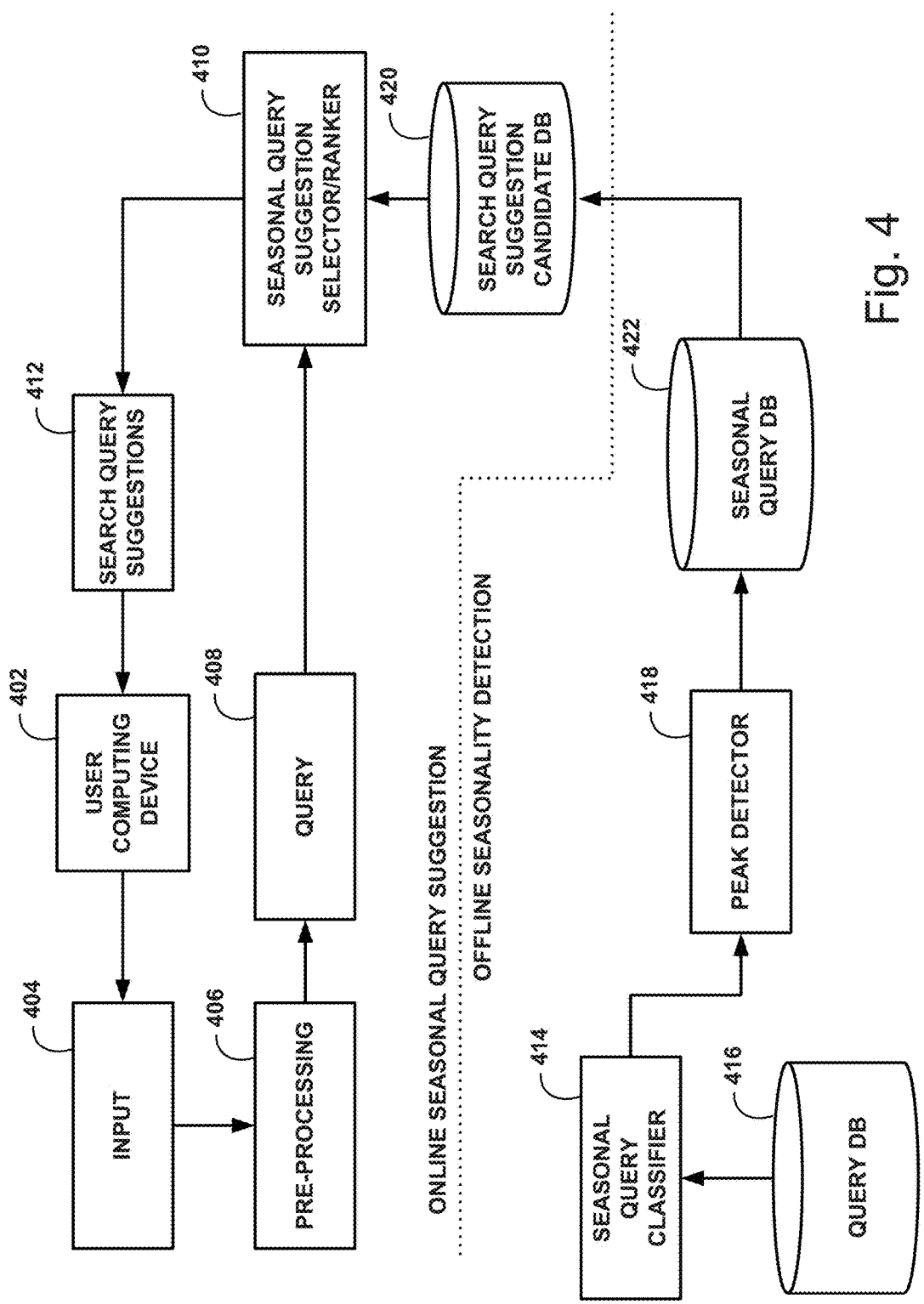

FIG. 4 illustrates components of a system providing seasonal-aware search query suggestions in accordance with one or embodiments of the present disclosure. Input 404 may be received from user computing device 402, which may correspond to device 302 or other user computing device. As described in connection with FIG. 3, input 404 may be search query input received prior to receiving input from the user requesting that a search be conducted using the search query input. Input 404 may comprise one or more search terms received from a user of computing device 402. With reference to FIG. 3, input 404 may correspond to the contents of field 308, for example.

In accordance with one or more embodiments, input 404 may be received by a component of an online seasonal search assist and search query suggestion system. In the example shown in FIG. 4, a pre-processing component 406 of such an online system may receive the input 404 and process it before it becomes input as query 408 to seasonal query suggestion selector and ranker component 410.

By way of a non-limiting example, the pre-processing component 406 may include processing to tokenize the input 404 to break the input 404 into segments, or tokens. A token may be defined as an alphanumeric string which occurs delimited by whitespace or punctuation, for example. By way of a further non-limiting example, the pre-processing component 406 may parse the input 404 to locate terms and operators, such as Boolean operators, remove stop words and perform stemming on the input 404, etc.

The pre-processing component 406 generates query 408, which is input to seasonal query suggestion component 210. The component 410 selects a number of search query suggestions 412 comprising one or more seasonal search query suggestions, which are made available to the user computing device 402. With reference to FIG. 3, the search query suggestions 412 may be transmitted to, for receipt by, the user computing device 302 and displayed in portion 312 of the user interface 304.

In accordance with one or more embodiments, the seasonal query suggestion component 410 may comprise a ranking capability, which may be used to rank the search query suggestions 412 prior to making them available to the user computing device 402.

In accordance with one or more embodiments, the seasonal query suggestion component 410 selects the search query suggestions 412 from a plurality of candidate search query suggestions stored in search query suggestion candidate database 420, which may generated using an offline process. In accordance with one or more embodiments, search query suggestion candidate database 420 may comprise search query suggestion candidates having seasonal aspects, also referred to herein as seasonal search query suggestion candidates, as well as search query suggestion candidates without seasonal aspects, also referred to herein as non-seasonal search query suggestion candidates.

In accordance with one or more embodiments, each of the search query suggestion candidates has an associated frequency of occurrence, which may be used as a popularity score.

By way of a non-limiting example, the offline process may comprise a seasonal query classifier 414 configured to classify search queries from historical query data from a plurality prior query activity logged, or stored, by one or more search engines as having, or alternatively not having, seasonal aspects.

Query database 416 may be generated using data from query logs maintained by the one or more search engines. In accordance with one or more embodiments, each item in the query database 416 corresponds to one occurrence of a query and may have a number of associated attributes, which attributes include the query's terms and a timestamp, or other temporal information. A query's popularity may be determined based on a frequency of occurrence of the query in the query logs. The query logs may further include user click information.

Seasonal query classifier 414 is configured to identify seasonal aspects, or seasonality, for a given query. Seasonal query classifier 414 may use any of a number of seasonal categories, or types, such as and without limitation hour a day, day of week, month of the year, etc. Peak detector 418 receives the output of the query classifier 414 for queries in the query database 416 and is configured to generate seasonal query database 422, which may be replicated, or copied, to search query suggestion candidate database 420. As discussed above, database 420 may be used by seasonal query suggestion component 410 to identify search query suggestions 412.

Database 420 comprises, for each seasonal search query suggestion, seasonal information identifying one or more seasonal peaks. In accordance with one or more embodiments, peak detector 418 is configured to detect seasonal peaks, which are also referred to herein as peaks. By way of a non-limiting example, a query might have an "hour of the day" seasonal aspect, in which case the query's seasonal information may comprise information identifying the hour(s) of the day that the query's occurrence peak(s); such as and without limitation 16:00 using a twenty-four hour clock. By way of a further non-limiting example, a query might have a "day of the week" seasonal aspect, in which case the query's seasonal information may comprise information identifying the day(s) of the week that the query's occurrence peak(s); such as and without limitation, "Monday" and "Sunday."

In accordance with one or more embodiments, peak detector 418 is further configured to detect those query(s) that have no seasonal aspect, and any such query may be referred to herein as a non-seasonal query. Peak detector 418 is further configured to re-classify a query classified as seasonal by the classifier 414 to be non-seasonal.

Figure 5:
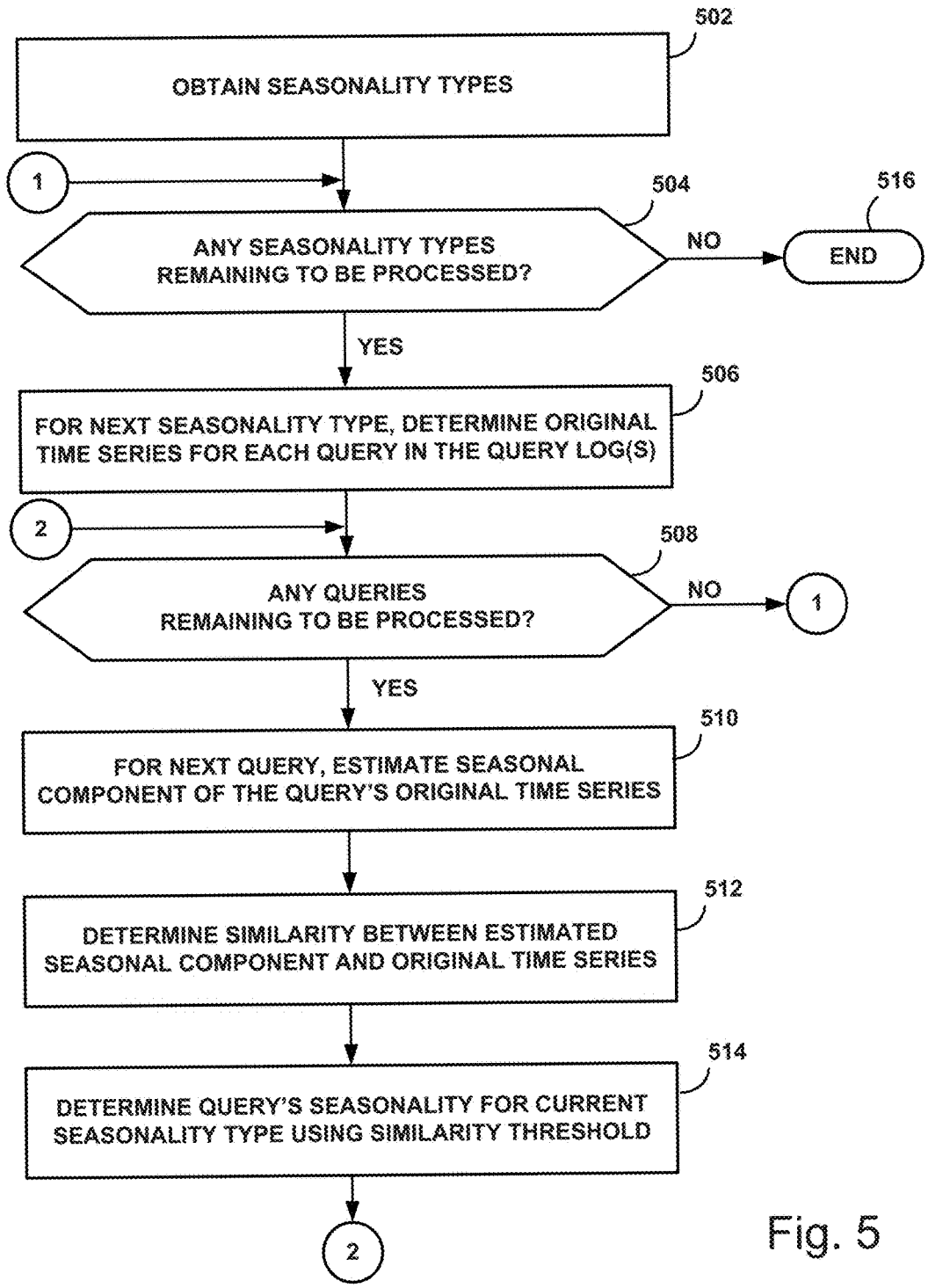

FIG. 5 provides an example process flow used in classifying a query as seasonal or non-seasonal in accordance with one or more embodiments of the present disclosure. The process flow example shown in FIG. 5 may be performed by a computing system configured to provide the seasonal query classifier 414 of FIG. 4, for example.

At step 502, each of the seasonality types that are to be used in detecting seasonality of queries, e.g., queries from query database 416, are determined. By way of a non-limiting example, seasonality types may be predetermined, such as by way of a system preference, parameter, etc. Some non-limiting examples of types, or kinds, of seasonality include hour a day, day of week, week of the month, month of the year, year of the decade, etc.

At step 504, a determination is made whether any seasonality types remain to be processed. If not, processing ends at step 516. If it is determined, at step 504, that seasonality types remain to be processed, processing continues at step 506 to determine an original time series for each query, e.g., each query in the query database 416. FIGS. 1 and 2 provide examples of original time series for the "pizza hut" and "florida lottery" queries. As shown in the examples, each time series comprises a number of data pairs, each of which associates a frequency component with a temporal component. In the example shown in FIG. 1, which provides an example of a time series for a "time of day" seasonality type, each circle, or point, shown in the graph corresponds to a pairing of a frequency of occurrence of the "pizza hut" query for a given time of day. In the example shown in FIG. 2, which provides an example of a time series for a "day of the week" seasonality type, each circle or point shown in the graph corresponds to a pairing of a frequency of occurrence of the "florida lottery" query for a given day of a given week.

By way of a non-limiting example, an original time series for a query may be determined by identifying each occurrence of the query in the historical query data, e.g., query database 416, and using the temporal information, e.g. a timestamp, associated with each occurrence of the query in the query data to count the number of occurrences of the query at each time interval of the seasonality type. For a given query, each point in the query's original time series has a frequency, or number of occurrences, of the query and the time at which the query occurred, e.g., the time of the user input of the query.

At step 508 of FIG. 5, a determination is made whether any queries remain to be processed. If not processing continues at step 504 to process any remaining seasonality types. If it is determined, at step 508, that a query remains to be processed, processing continues at step 510, which is performed along with steps 512 and 514 for the next query.

Figure 7:
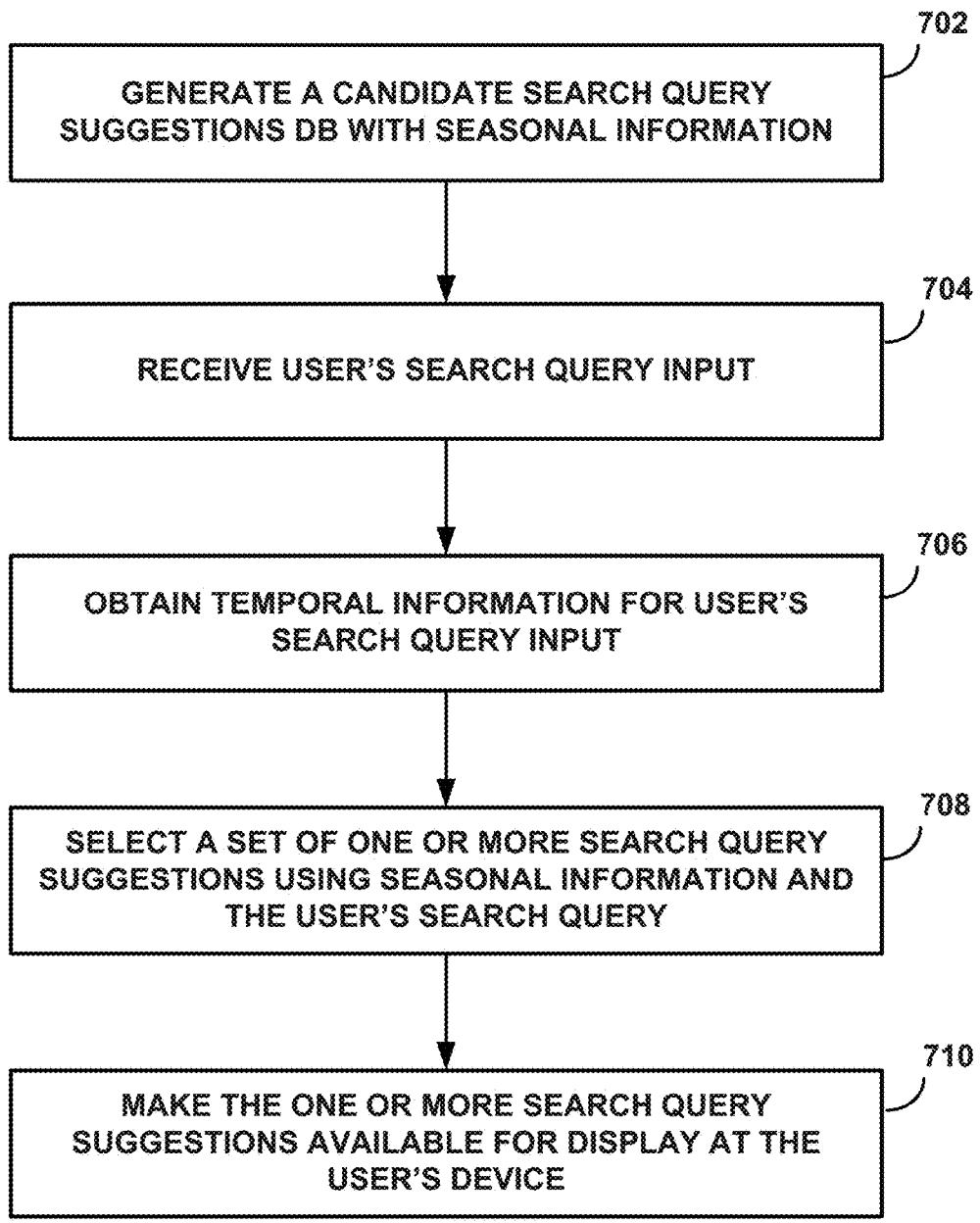
Figure 8:
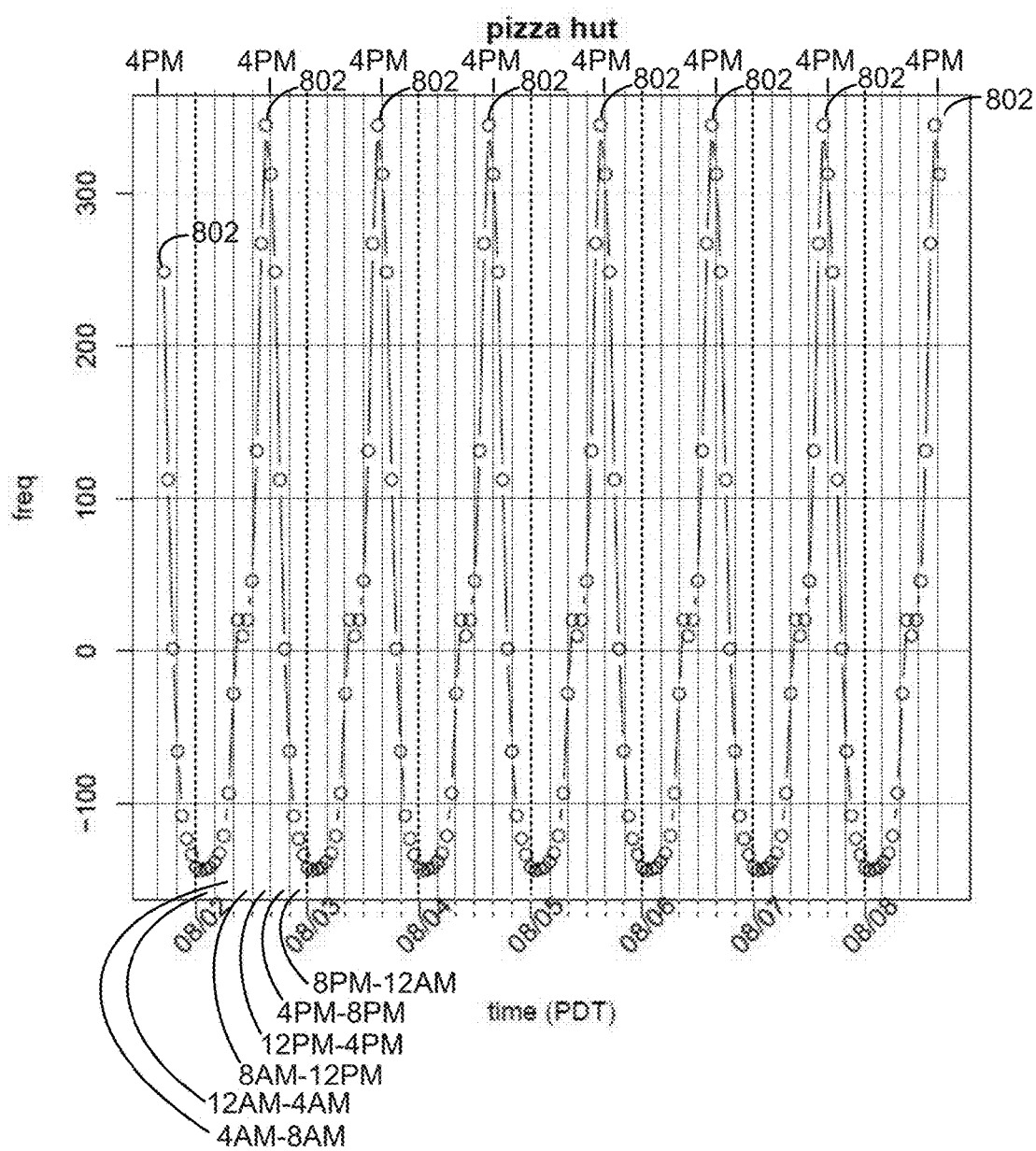

At step 510, a seasonal component for the next query's original time series is estimated. In accordance with one or more embodiments, a query's original time series may comprise a seasonal component, a trend component and a remainder component. The remainder component may represent user input activity that does not amount to a trend or a seasonal pattern, a trend may show an increase, decrease, or change in direction, and a seasonal component may show a pattern of peaks in user input of the query at certain intervals, e.g., at a given time, or times, of the day, on a given day, or days, of the week, etc. By way of a non-limiting example, a seasonal index, or other average, may be used to measure seasonal variations in a time series, such as the times series shown in FIGS. 1 and 2. FIGS. 7 and 8 provide examples of seasonal component time series estimates corresponding to the time series shown in FIGS. 1 and 2, respectively.

At step 512 of FIG. 5, a measure of similarity is determined between the query's original time series and seasonal component time series. By way of a non-limiting example, a measure of similarity between the query's original and estimated seasonal component time series may be determined by using a computed cosine similarity score between the query's original and estimated seasonal component time series. At step 514, the determined measure of similarity is compared to a threshold similarity to determine whether the query has a seasonality aspect for the current seasonality type. Processing continues at step 508 to process any remaining queries.

In accordance with one or more embodiments, the similarity threshold that is used at step 514 may be empirically set. A lower threshold might be used to identify more queries as seasonal queries, and conversely a higher similarity threshold may be used to identify fewer queries as seasonal queries. In accordance with one or more embodiments, peak detector 418 of FIG. 4 may reclassify seasonal queries as non-seasonal queries based on an absence of peaks. The similarity threshold may be raised if too many queries are being classified as seasonal queries at step 514, for example.

Figure 6:
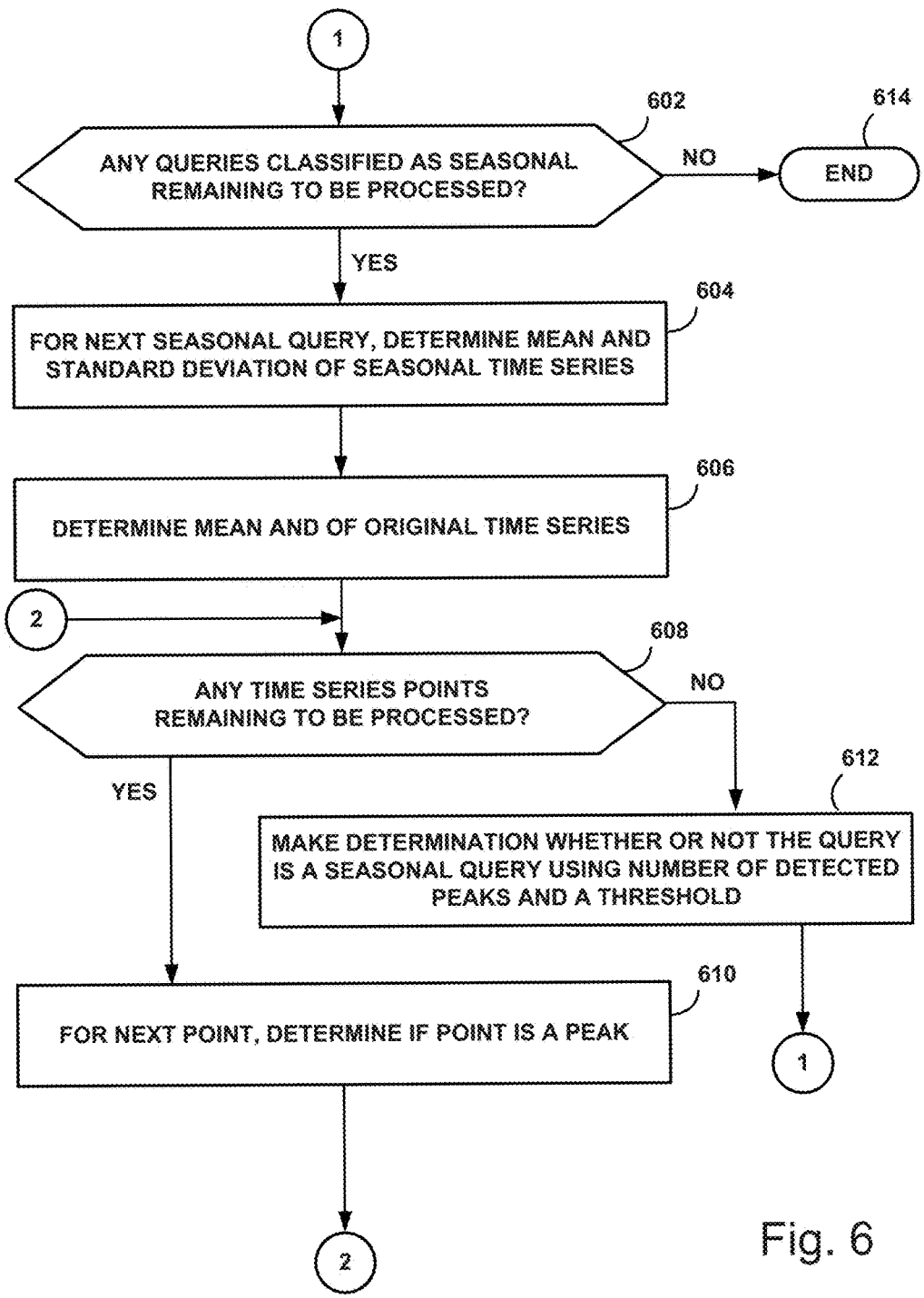

FIG. 6 provides an example process flow used in peak detection in accordance with one or more embodiments of the present disclosure. The process flow example shown in FIG. 6 may be performed by a computing system configured to provide peak detector 418 of FIG. 4, for example.

At step 602, a determination is made whether any queries classified as seasonal remain to be processed. By way of a non-limiting example, seasonal queries may be those identified using the process shown in FIG. 5, which may be implemented by a computer providing the query classifier 414 of FIG. 4.

If a determination is made, at step 602, that no seasonal queries remain to be processed, processing may end at step 614; however, if a determination is made that queries remain to be processed, processing continues at step 604. Steps 604, 606, 608, 610 and 612 may be performed for the next query. At step 604, a mean, or average, number of occurrences and a standard deviation are determined for the next seasonal query using the seasonal component time series. By way of a non-limiting example, the mean may be determined to be the total of the number of occurrences associated with each point in the seasonal component time series divided by the number of points in the seasonal component time series, and the determined mean may be used to calculate the standard deviation. At step 606, a mean, or average, number of occurrences is determined for the seasonal query using the query's original time series.

At step 608, a determination is made whether any time series points, e.g., the original and/or seasonal component time series points, remain to be processed. If time series points remain to be processed, processing continues at step 610 to determine whether or not the next point in the time series for the current seasonal query is a peak, and processing continues at step 608 to process any remaining points. If it is determined, at step 608, that no points remain to be processed, processing continues at step 612 to determine whether the query is a seasonal query using the number of detected peak points and a threshold number of peak points.

With reference to step 610, in accordance with at least one embodiment of the present disclosure, the seasonal component time series' determined mean and standard deviation and original time series' determined mean can be used in making a determination whether or not the time series point is considered to be a peak. In accordance with one or more embodiments, a point may be considered to be a peak if two conditions are satisfied. The first condition is satisfied if the point's frequency exceeds a first threshold value that is determined by adding the seasonal time series mean and a threshold multiple of the seasonal time series standard deviation, which can be expressed as: mean+(threshold*standard deviation); and the second condition is satisfied if the point's frequency exceeds the original time series' mean. The threshold number of standard deviations may be set empirically. By way of a non-limiting example, a higher threshold number of standard deviations may be used to exclude lower peaks thereby identifying the higher peaks, and a lower threshold number of standard deviations may be used to include lower peaks.

With reference to step 612, in accordance with at least one embodiment of the present disclosure, the threshold number of peaks may be set empirically. By way of a non-limiting example, a higher threshold may be used to identify more queries as seasonal, and a lower threshold may be used to restrict the number of queries identified as seasonal. In accordance with one or more embodiments of the present disclosure, information identifying the detected peaks of a seasonal query are stored, e.g., in databases 420 and 422, as part of the information for the query.

Figure 9:
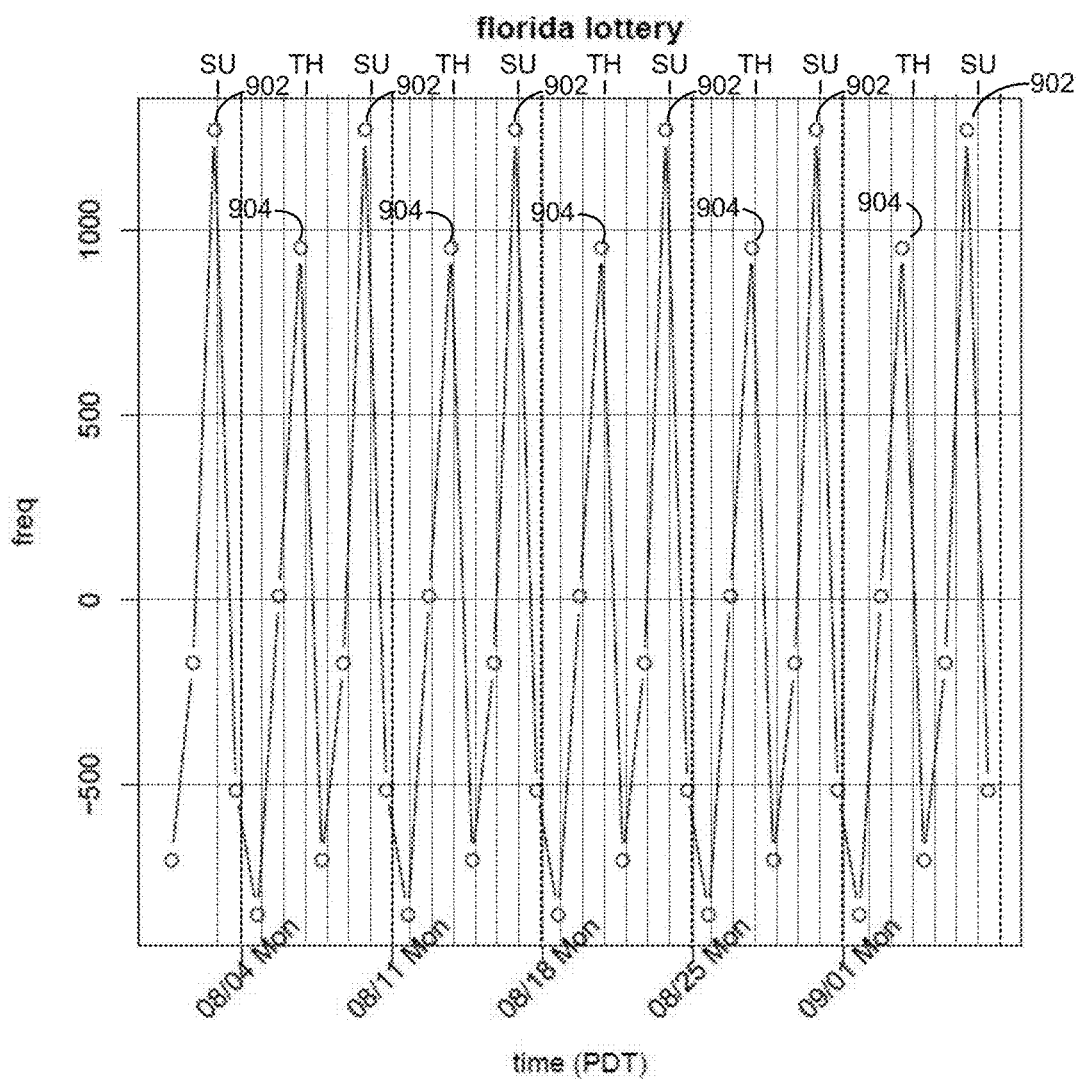

With reference to FIGS. 8 and 9, points 802 of FIG. 8 and points 902 and 904 represent seasonal peaks. Points 802 of FIG. 8 correspond to points 102 of FIG. 1, and points 902 and points 904 correspond to points 202 and 204, respectively, of FIG. 2. By way of a further non-limiting example and assuming a threshold number of peaks for the "time of day" seasonality was 6 and each of the points 102, or points 802, are considered to be seasonal peaks, the "pizza hut" query is classified as a seasonal query, since the number of detected peaks, i.e., 8, exceeds the threshold number, i.e., 6. In such a case, the seasonal query database 422 and the search query suggestion candidate database 420 would include seasonality information indicating that the "pizza hut" query has daily seasonal peak at, or around, 4 PM.

In accordance with one or more embodiments, in databases 420 and 422, the seasonal information stored for the "pizza hut" seasonal search query suggestion comprises peak information identifying 4 PM, information identifying the "time of day" seasonality type, and the seasonal information stored for the "florida lottery" seasonal search query suggestion comprises peak information identifying "Thursday" and "Sunday" as peaks for the "day of the week" seasonality type. In accordance with one or more such embodiments, each seasonal and non-seasonal search query suggestion has stored information identifying its popularity score, which may correspond to the frequency of occurrence of the query in the query database 416.

Referring again to FIG. 4, the seasonal query suggestion component 410 may, in accordance with one or more embodiments of the present disclosure, use query 408 to identify whether or not any of the search query suggestion candidates stored in database 420 match the query 408. A matching search query suggestion may have a number of search terms in common with the query 408, for example. Any matching search query suggestion candidates may be ranked in accordance with the search query suggestion candidate's popularity score relative to the popularity scores of the other matching search query suggestion candidates. A search query suggestion candidate's popularity may correspond to the frequency, or number, of occurrences of the search query suggestion candidate in the query the database 416. The matching search query suggestion candidates may be sorted in descending order based on popularity score, for example. A number, N, of the top-ranking matching search query suggestion candidates whose popularity score is more than a threshold popularity may be identified.

Temporal information associated with the search query user input 404 may be used to examine each of the N top ranked search query suggestion candidates. By way of a non-limiting example, if the search query user input's temporal information matches, or at least coincides with, a search query suggestion candidate's seasonal peak time, the search query suggestion candidate is considered to be a seasonal search query suggestion and is promoted above non-seasonal search query suggestions in the N top ranked search query suggestions. Such a promotion may be further based on the seasonal search query suggestions popularity score such that its position with respect to other seasonal search query suggestions may be determined using its popularity score relative to the popularity scores of other seasonal search query suggestions matching the search query user input. In other words, the popularity score associated with each seasonal search query suggestion may be used in determining each seasonal search query suggestion's position relative to the other seasonal search query suggestions in the N top ranked search query suggestions. By way of a non-limiting example, the most popular seasonal search query suggestion may be placed in the number one position, the next most popular seasonal search query suggestion may be placed in the number two position and so on, with the any non-seasonal search query suggestion candidates being positioned below the least popular of the seasonal search query suggestions.

By way of some non-limiting examples, a temporal match may exist in a case that the temporal information associated with a peak of a seasonal search query suggestion matches temporal information associated with the user's search query input. The temporal match may be found in a case that there is an exact match in the temporal information, such as and without limitation the user's search query is input on "Sunday" and "Sunday" is one of a seasonal search query suggestion's peak "days of the week." A temporal match may exist in a case that the temporal information coincides in some way but may not necessarily be an exact match, such as and without limitation a case where the user's search query input has a time of day of 3:34 PM and 4 PM is one of a seasonal search query suggestion's peak "times of the day." A match may be found where the timing of the user's search query input is within a given range of a seasonal query suggestion's peak and/or the seasonal query suggestion's peak may be expressed as a range of time. By way of some non-limiting examples, a range may identify a period of time in a day, such as 3 PM to 7 PM, a number of days in a week, such as Monday through Friday or Saturday and Sunday, months of a year, such as June to September, and so on.

FIG. 7 provides a process flow example in accordance with one or more embodiments of the present disclosure. At step 702, a candidate search query suggestion database, such as seasonal-aware suggestion candidate database 420, is generated. The database includes seasonality information associated with a number of the candidate search query suggestions stored in the database. In accordance with one or more embodiments, the seasonality information may identify a search query suggestion candidate to be either a seasonal or non-seasonal query. In the case of a seasonal query, the seasonality information may further identify the nature of the seasonality, e.g., daily at 4 PM, etc. In addition, the database 420 stores a popularity score, which may correspond to a frequency of occurrence of the search query in historical query log data.

At step 704, search query user input is received. By way of a non-limiting example, the search query user input can correspond to input 404 received from user computing device 402. At step 706, temporal information is obtained for the user's input. The obtained temporal information represents a timing that the search query is input by the user. By way of a non-limiting example, such information may be obtained, over a network, using date and time information obtained from the user's computing device 402. It should be apparent that any technique now known or later developed for obtaining a temporal information in connection with the user's search query input may be used with embodiments of the present disclosure.

At step 708, one or more search query suggestions are selected from the plurality of candidate search query suggestions in the database using the user's obtained temporal information, the associated seasonality information for the number of candidate search query suggestions and the search query user input.

In accordance with one or more embodiments, the search query user input may be used to identify the candidate search query(s) having the same or similar query terms as the user's search query. The matching may use a prefix matching algorithm, for example. The seasonality information associated with the identified candidate search query(s) may be used to identify which ones of the identified candidate search query(s) have a seasonality coinciding with the temporal information of the user's search query input.

In accordance with one or more embodiments, seasonal search query candidates selected for the user may be moved above non-seasonal search query candidates, and may be ordered based on each one's popularity score relative to the respective popularity scores of the other seasonal search query candidate(s). The non-seasonal search query candidates may also be ordered based on their respective popularity scores.

A number, N, of the identified candidate search query suggestion(s) are selected for presentation to the user. The selected query(s) may be the N top-ranked search query suggestion(s), and may comprise a number of seasonal search query suggestions and a number of non-seasonal search query suggestions, where the aggregate number equals N. The seasonal search query suggestions may be promoted to the top of the list of search query suggestions to be presented to the user. By way of a non-limiting example, the seasonal search query suggestions may be moved to the top of the list, with the most popular one of the seasonal search query suggestions being promoted to the top of the list, the next most popular being promoted to the second position at the top of the list, and so on.

At step 710, a number of the one or more search query suggestions selected at step 708 are made available for display at the user's device. By way of a non-limiting example, the set of search query suggestions may be transmitted via a communication network, such as an electronic communication network, to the user's device.

Figure 10:
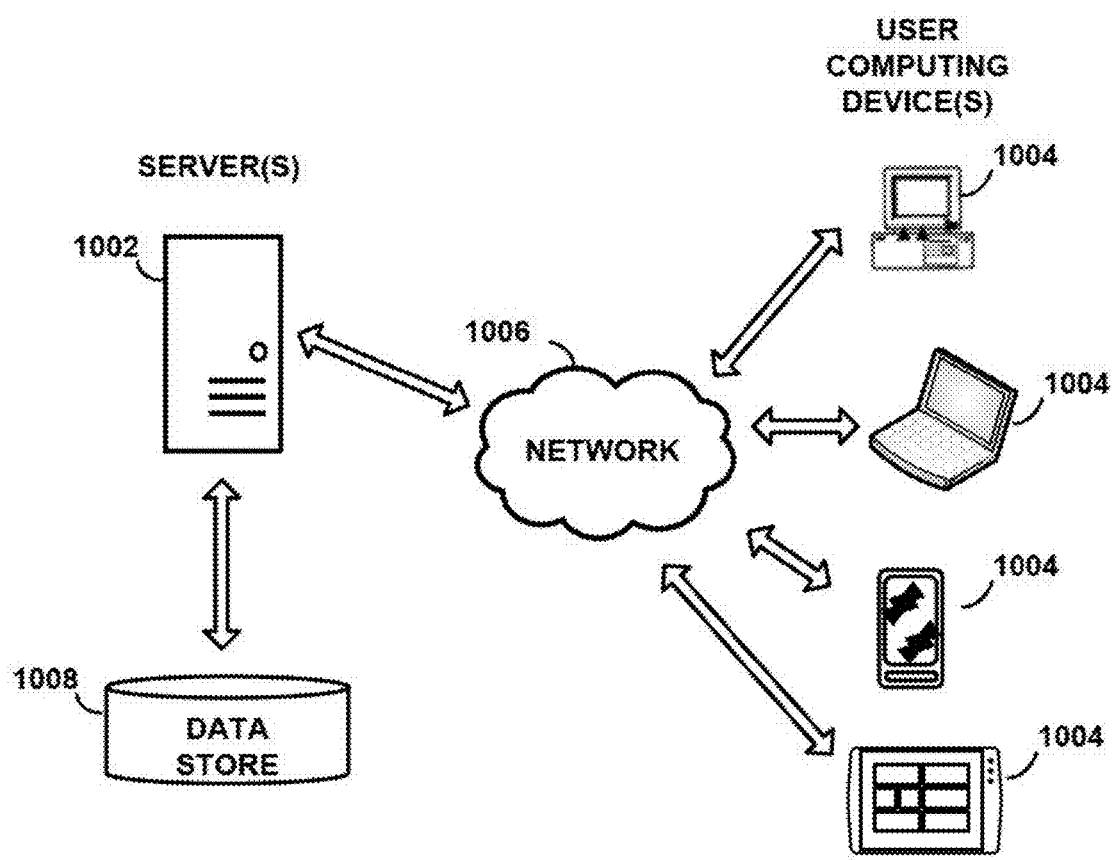
FIG. 10 illustrates some components that can be used in connection with one or more embodiments of the present disclosure.

FIG. 10 illustrates some components that can be used in connection with one or more embodiments of the present disclosure. In accordance with one or more embodiments of the present disclosure, one or more computing devices, e.g., one or more servers, user devices, such as user computing devices 302 and 402, or other computing device, are configured to comprise functionality described herein. For example, a computing device 1002, alone or in combination with user computing device 1004, can be configured to execute program code, instructions, etc. to provide functionality in accordance with one or more embodiments of the present disclosure.

Computing device 1002 can serve content to user computing devices 1004 using a browser application via a network 1006. Data store 1008, which can include databases 416, 420 and 422, query logs, etc., can be used to store program code to configure a server 1002 to functionality in accordance with one or more embodiments of the present disclosure.

The user computing device 1004, which may correspond to user computing device 302 and 402, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1002 and the user computing device 1004 can include one or more processors, memory, a removable media reader, network interface, display and interface, and one or more input devices, e.g., keyboard, keypad, mouse, etc. and input device interface, for example. One skilled in the art will recognize that server 1002 and user computing device 1004 may be configured in many different ways and implemented using many different combinations of hardware, software, or firmware.

In accordance with one or more embodiments, a computing device 1002 can make a user interface available to a user computing device 1004 via the network 1006. The user interface made available to the user computing device 1004 can include content items, or identifiers (e.g., URLs) selected for the user interface in accordance with one or more embodiments of the present invention. In accordance with one or more embodiments, computing device 1002 makes a user interface available to a user computing device 1004 by communicating a definition of the user interface to the user computing device 1004 via the network 1006. The user interface definition can be specified using any of a number of languages, including without limitation a markup language such as Hypertext Markup Language, scripts, applets and the like. The user interface definition can be processed by an application executing on the user computing device 1004, such as a browser application, to output the user interface on a display coupled, e.g., a display directly or indirectly connected, to the user computing device 1004.

In an embodiment the network 1006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating electronic communications networks and/or digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 10. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 11:
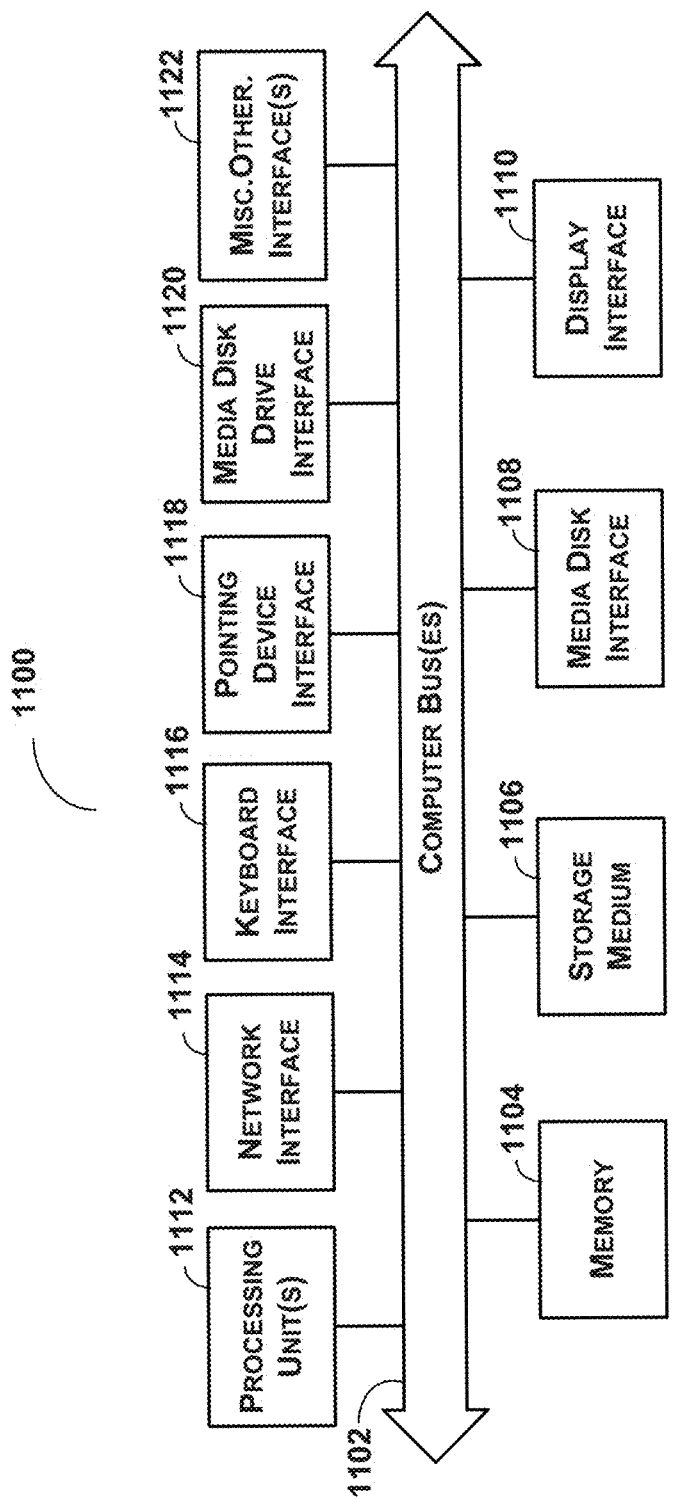
FIG. 11 is a detailed block diagram illustrating an internal architecture of a computing device in accordance with one or more embodiments of the present disclosure.

FIG. 11 is a detailed block diagram illustrating an internal architecture of a computing device, e.g., a computing device such as server 1002 or user computing device 1004, in accordance with one or more embodiments of the present disclosure. As shown in FIG. 11, internal architecture 1100 includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), etc., media disk drive interface 1120 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, computer-readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
 generating, by a computing device, a database comprising a plurality of candidate search query suggestions, a number of the candidate search query suggestions of the plurality having associated seasonal information;

receiving, over a network by the computing device, search query user input from a user computing device;

obtaining, over the network by the computing device, temporal information representing the time the search query is input by the user;

selecting, by the computing device, one or more search query suggestions from the database using the search query user input, the obtained temporal information and the associated seasonal information for the number of candidate search query suggestions, at least a portion of the seasonal information associated with each of the one or more selected search query suggestions matching the obtained temporal information, search query suggestion selection comprising generating a list comprising the selected search query suggestions and ordering the seasonal search query suggestions included in the list based on each one's respective popularity score, the generated list further comprising a number of non-seasonal search query suggestions positioned below the seasonal search query suggestions in the list, and ordering the non-seasonal search query suggestions included in the list based on each one's respective popularity score; and making, by the computing device, a number of the one or more selected search query suggestions available for display at the user computing device.

2. The method of claim 1, the generating a database comprising a plurality of candidate search query suggestions further comprising:

identifying, by the computing device, a plurality of search queries from one or more query logs as seasonal search queries; and storing, in the database for each identified seasonal search query by the computing device, the seasonal search query and associated seasonal information.

3. The method of claim 2, the associated seasonal information comprising information identifying one or more seasonal peaks for a seasonality type.

4. The method of claim 2, the identifying further comprising:

classifying, by the computing device for a seasonality type, a query as seasonal using logged occurrences of the query and temporal information about each occurrence of the query in the one or more query logs;

detecting, by the computing device for the seasonality type, a number of seasonal peaks for the query using the logged occurrences of the query and the temporal information about each occurrence of the query in the one or more query logs.

5. The method of claim 4, the classifying further comprising:

generating, by the computing device for the seasonality type and the query, an original time series using the logged occurrences of the query and the temporal information about each occurrence of the query, each point in the original time series defined by an associated frequency of occurrence and a time period;

estimating, by the computing device, a seasonal time series using the original time series;

determining, by the computing device, a similarity between the query's original and seasonal time series; and classifying, by the computing device, the query as seasonal based on a determination that the determined similarity satisfies a similarity threshold.

6. The method of claim 5, the detecting further comprising:

determining, by the computing device, a mean and standard deviation for the estimated seasonal component time series using each point's frequency of occurrence in the estimated seasonal component time series;

determining, by the computing device, a mean for the original time series using each point's frequency of occurrence in the original time series; and determining, by the computing device and for each point in the query's original time series, whether or not the point is a seasonal peak using the mean and standard deviation determined for the estimated seasonal component time series and the mean determined for the original time series.

7. The method of claim 6, further comprising:

reclassifying, by the computing device, the query as non-seasonal if a number of points determined to be peaks is less than a threshold number.

8. A system comprising:

a computing device comprising a processor and a storage medium for tangibly storing thereon program logic for execution by the processor, the stored program logic comprising:

generating logic executed by the processor for generating a database comprising a plurality of candidate search query suggestions, a number of the candidate search query suggestions of the plurality having associated seasonal information;

receiving logic executed by the processor for receiving, over a network, search query user input from a user computing device;

obtaining logic executed by the processor for obtaining, over the network, temporal information representing the time the search query is input by the user;

selecting logic executed by the processor for selecting one or more search query suggestions from the database using the search query user input, the obtained temporal information and the associated seasonal information for the number of candidate search query suggestions, at least a portion of the seasonal information associated with each of the one or more selected search query suggestions matching the obtained temporal information, search query suggestion selection comprising generating a list comprising the selected search query suggestions and ordering the seasonal search query suggestions included in the list based on each one's respective popularity score, the generated list further comprising a number of non-seasonal search query suggestions positioned below the seasonal search query suggestions in the list, and ordering the non-seasonal search query suggestions included in the list based on each one's respective popularity score; and making logic executed by the processor for making a number of the one or more selected search query suggestions available for display at the user computing device.

9. The system of claim 8, the generating logic for generating a database comprising a plurality of candidate search query suggestions further comprising:

identifying logic executed by the processor for identifying a plurality of search queries from one or more query logs as seasonal search queries; and storing logic executed by the processor for storing, in the database for each identified seasonal search query, the seasonal search query and associated seasonal information.

10. The system of claim 9, the associated seasonal information comprising information identifying one or more seasonal peaks for a seasonality type.

11. The system of claim 9, the identifying logic further comprising:
classifying logic executed by the processor for classifying, for a seasonality type, a query as seasonal using logged occurrences of the query and temporal information about each occurrence of the query in the one or more query logs;
detecting logic executed by the processor for detecting, for the seasonality type, a number of seasonal peaks for the query using the logged occurrences of the query and the temporal information about each occurrence of the query in the one or more query logs.

12. The system of claim 9, the classifying logic further comprising:
generating logic executed by the processor for generating, for the seasonality type and the query, an original time series using the logged occurrences of the query and the temporal information about each occurrence of the query, each point in the original time series defined by an associated frequency of occurrence and a time period;
estimating logic executed by the processor for estimating a seasonal time series using the original time series;
determining logic executed by the processor for determining a similarity between the query's original and seasonal time series; and
classifying logic executed by the processor for classifying the query as seasonal based on a determination that the determined similarity satisfies a similarity threshold.

13. The system of claim 12, the detecting logic further comprising:
determining logic executed by the processor for determining a mean and standard deviation for the estimated seasonal component time series using each point's frequency of occurrence in the estimated seasonal component time series;
determining logic executed by the processor for determining a mean for the original time series using each point's frequency of occurrence in the original time series; and
determining logic executed by the processor for determining, for each point in the query's original time series, whether or not the point is a seasonal peak using the mean and standard deviation determined for the estimated seasonal component time series and the mean determined for the original time series.

14. The system of claim 13, the stored program logic further comprising:
reclassifying logic executed by the processor for reclassifying the query as non-seasonal if a number of points determined to be peaks is less than a threshold number.

15. A computer readable non-transitory storage medium for tangibly storing thereon computer readable instructions that when executed cause a computing device to:
generate a database comprising a plurality of candidate search query suggestions, a number of the candidate search query suggestions of the plurality having associated seasonal information;
receive, over a network, search query user input from a user computing device;
obtain, over the network, temporal information representing the time the search query is input by the user;
select one or more search query suggestions from the database using the search query user input, the obtained temporal information and the associated seasonal information for the number of candidate search query suggestions, at least a portion of the seasonal information associated with each of the one or more selected search query suggestions matching the obtained temporal information, search query suggestion selection comprising generating a list comprising the selected search query suggestions and ordering the seasonal search query suggestions included in the list based on each one's respective popularity score, the generated list further comprising a number of non-seasonal search query suggestions positioned below the seasonal search query suggestions in the list, and ordering the non-seasonal search query suggestions included in the list based on each one's respective popularity score; and
make a number of the one or more selected search query suggestions available for display at the user computing device.

16. The computer readable non-transitory storage medium of claim 15, the computer readable instructions that when executed cause a computing device to generate a database comprising a plurality of candidate search query suggestions further comprising instructions that when executed cause the computing device to:
identify a plurality of search queries from one or more query logs as seasonal search queries; and
store, in the database for each identified seasonal search query, the seasonal search query and associated seasonal information.

17. The computer readable non-transitory storage medium of claim 16, the associated seasonal information comprising information identifying one or more seasonal peaks for a seasonality type.

18. The computer readable non-transitory storage medium of claim 16, the computer readable instructions that when executed cause a computing device to identify further comprising instructions that when executed cause the computing device to:
classify, for a seasonality type, a query as seasonal using logged occurrences of the query and temporal information about each occurrence of the query in the one or more query logs;
detect, for the seasonality type, a number of seasonal peaks for the query using the logged occurrences of the query and the temporal information about each occurrence of the query in the one or more query logs.

19. The computer readable non-transitory storage medium of claim 16, the computer readable instructions that when executed cause a computing device to classify further comprising instructions that when executed cause the computing device to:
generate, for the seasonality type and the query, an original time series using the logged occurrences of the query and the temporal information about each occurrence of the query, each point in the original time series defined by an associated frequency of occurrence and a time period;
estimate a seasonal time series using the original time series;
determine a similarity between the query's original and seasonal time series; and
classify the query as seasonal based on a determination that the determined similarity satisfies a similarity threshold.

20. The computer readable non-transitory storage medium of claim 19, the computer readable instructions that when executed cause a computing device to detect further comprising instructions that when executed cause the computing device to:
  determine a mean and standard deviation for the estimated seasonal component time series using each point's frequency of occurrence in the estimated seasonal component time series;
  determine a mean for the original time series using each point's frequency of occurrence in the original time series; and
  determine, for each point in the query's original time series, whether or not the point is a seasonal peak using the mean and standard deviation determined for the estimated seasonal component time series and the mean determined for the original time series.

21. The computer readable non-transitory storage medium of claim 20, the computer readable instructions further comprising computer readable instructions that when executed cause a computing device to:
  reclassify the query as non-seasonal if a number of points determined to be peaks is less than a threshold number.

* * * * *